United States Patent
Meyer et al.

(10) Patent No.: US 11,656,138 B2
(45) Date of Patent: May 23, 2023

(54) PRESSURE SENSOR ASSEMBLY

(71) Applicant: Rosemount Inc., Shakopee, MN (US)

(72) Inventors: Nicholas Edward Meyer, Chaska, MN (US); Mark George Romo, Eden Prairie, MN (US); Eric Paul Petersen, Minnetonka, MN (US); Timothy David Lasonne, St. Paul, MN (US); David Jonathon Hillman, Prescott, WI (US)

(73) Assignee: ROSEMOUNT INC., Shakopee, MN (US)

( * ) Notice: Subject to any disclaimer, the term of this patent is extended or adjusted under 35 U.S.C. 154(b) by 317 days.

(21) Appl. No.: 16/906,194

(22) Filed: Jun. 19, 2020

(65) Prior Publication Data
US 2021/0396615 A1 Dec. 23, 2021

(51) Int. Cl.
*G01L 9/02* (2006.01)
*G01L 7/08* (2006.01)
*G01L 19/14* (2006.01)
*G01L 9/00* (2006.01)
*G01L 13/02* (2006.01)

(52) U.S. Cl.
CPC .......... *G01L 9/0051* (2013.01); *G01L 9/0044* (2013.01); *G01L 13/025* (2013.01); *G01L 9/0048* (2013.01); *G01L 19/145* (2013.01)

(58) Field of Classification Search
CPC ............. G01L 9/008; G01L 2009/0066; G01L 2009/0067; G01L 2009/0069; G01L 13/025; G01L 19/04; G01L 19/145; G01L 19/147
See application file for complete search history.

(56) References Cited

U.S. PATENT DOCUMENTS

| | | | | |
|---|---|---|---|---|
| 4,773,269 A | * | 9/1988 | Knecht | G01L 19/0038 73/706 |
| 5,022,270 A | | 6/1991 | Rud, Jr. | |
| 5,695,590 A | | 12/1997 | Willcox et al. | |
| 6,109,113 A | * | 8/2000 | Chavan | G01L 9/0073 73/706 |
| 6,566,158 B2 | | 5/2003 | Eriksen et al. | |

(Continued)

OTHER PUBLICATIONS

Notification of Transmittal of the International Search Report and the Written Opinion of the International Searching Authority from PCT/US2021/021519, dated Jun. 9, 2021.

(Continued)

*Primary Examiner* — Herbert K Roberts
(74) *Attorney, Agent, or Firm* — Westman, Champlin & Koehler, P.A.

(57) ABSTRACT

A pressure sensor assembly includes a pressure sensor, a pedestal and an electrically conductive header having a header cavity. The pressure sensor includes, an electrically conductive sensing layer having a sensor diaphragm, an electrically conductive backing layer having a bottom surface that is bonded to the sensing layer, an electrically insulative layer having a bottom surface that is bonded to a top surface of the backing layer, and a sensor element having an electrical parameter that changes based on a deflection of the sensor diaphragm in response to a pressure difference. The pedestal is bonded to the electrically insulative layer and attached to the header within the header cavity.

18 Claims, 10 Drawing Sheets

(56) References Cited

U.S. PATENT DOCUMENTS

| | | | |
|---|---|---|---|
| 6,647,794 B1 * | 11/2003 | Nelson | G01L 9/0073 |
| | | | 73/718 |
| 7,856,885 B1 | 12/2010 | Bhansali et al. | |
| 8,141,429 B2 | 3/2012 | Guo | |
| 8,371,175 B2 * | 2/2013 | Romo | G01L 19/0007 |
| | | | 73/756 |
| 9,212,054 B1 * | 12/2015 | Kwa | B81C 1/00047 |
| 9,250,145 B2 | 2/2016 | Ned et al. | |
| 9,689,769 B2 | 6/2017 | Eriksen et al. | |
| 9,878,904 B1 * | 1/2018 | Potasek | B81C 1/0023 |
| 9,963,341 B2 | 5/2018 | Potasek et al. | |
| 10,048,152 B2 | 8/2018 | Fetisov et al. | |
| 10,060,813 B2 | 8/2018 | Willcox et al. | |
| 10,203,258 B2 | 2/2019 | Romo et al. | |
| 2002/0029639 A1 * | 3/2002 | Wagner | G01L 19/146 |
| | | | 73/756 |
| 2004/0226383 A1 | 11/2004 | Romo | |
| 2009/0108382 A1 | 4/2009 | Eriksen et al. | |
| 2011/0256652 A1 * | 10/2011 | Guo | G01L 19/0084 |
| | | | 257/E21.002 |
| 2017/0205303 A1 | 7/2017 | Sanden et al. | |
| 2019/0204172 A1 * | 7/2019 | Dauenhauer | G01L 9/0054 |

OTHER PUBLICATIONS

Examination Report from Indian Patent Application No. 202227070404, dated Feb. 16, 2023.

* cited by examiner

PRESSURE SENSOR ASSEMBLY

FIELD

Embodiments of the present disclosure relate to industrial process transmitters and, more specifically, to pressure sensor assemblies for use in such transmitters.

BACKGROUND

Industrial process field devices, such as process transmitters, are used in industrial process control and monitoring systems to monitor industrial process variables and communicate measured values of the process variable back to a control room in a chemical, petroleum, gas, pharmaceutical, or another fluid processing plant, for example. The term "process variable" refers to a physical or chemical state of matter or conversion of energy. Examples of process variables include pressure, temperature, flow, conductivity, pH, and other properties.

Pressure transmitters, and other pressure sensing field devices or instruments, include a pressure sensor that senses a pressure, such as the pressure of a process fluid. The pressure sensor provides an electrical output that indicates the sensed pressure. The sensed pressure may be processed by circuitry of the pressure transmitter and/or communicated to an external control unit.

Some types of pressure sensors require electrical isolation from a body of the transmitter. Additionally, it may be necessary to reliably seal oil-filled isolation units that transmit a process pressure to the pressure sensor.

SUMMARY

Embodiments of the present disclosure generally relate to pressure sensor assemblies and methods of producing the pressure sensor assemblies. One embodiment of a pressure sensor assembly includes a pressure sensor, a pedestal and an electrically conductive header having a header cavity. The pressure sensor includes, an electrically conductive sensing layer having a sensor diaphragm extending between perimeter support regions, the sensor diaphragm having a reduced thickness relative to the perimeter support regions. The pressure sensor also includes an electrically conductive backing layer having a bottom surface that is bonded to a top surface of the sensing layer, an electrically insulative layer having a bottom surface that is bonded to a top surface of the backing layer, and a sensor element having an electrical parameter that changes based on a deflection of the sensor diaphragm in response to a pressure difference between a first pressure on a first side of the sensor diaphragm and a second pressure on a second side of the sensor diaphragm that is opposite the first side. The pedestal includes a bottom surface that is bonded to a top surface of the electrically insulative layer. The pedestal is attached to the header within the header cavity, and the electrically insulative layer electrically insulates the sensing layer from the pedestal and the header.

In one example of a method of producing a pressure sensor assembly, a pressure sensor is formed by bonding a top surface of an electrically conductive backing layer to a bottom surface of an electrically insulative layer. An electrically conductive sensing layer is provided that includes a sensor diaphragm extending between perimeter support regions. The sensor diaphragm having a reduced thickness relative to the perimeter support regions. A top surface of the sensing layer is bonded to a bottom surface of the backing layer. A sensor element is formed having an electrical parameter that changes based on a deflection of the sensor diaphragm in response to a pressure difference between a first pressure on a first side of the sensor diaphragm and a second pressure on a second side of the sensor diaphragm that is opposite the first side. The pressure sensor is attached to a pedestal by bonding a bottom surface of the pedestal to a top surface of the electrically insulative layer. The pedestal is attached to an electrically conductive header within a header cavity. The electrically insulative layer electrically insulates the pressure sensor from the pedestal and the header.

Another embodiment of the pressure sensor assembly includes a pressure sensor, a pedestal and an electrically conductive header having a header cavity. The pressure sensor includes an electrically conductive sensing layer including a sensor diaphragm extending between perimeter support regions. The sensor diaphragm has a reduced thickness relative to the perimeter support regions. The pressure sensor also includes a backing layer assembly having one or more electrically conductive backing layers including a first backing layer having a bottom surface that is bonded to a top surface of the sensing layer through a first electrically insulative bond, and a sensor element having an electrical parameter that changes based on a deflection of the sensor diaphragm in response to a pressure difference between a first pressure on a first side of the sensor diaphragm and a second pressure on a second side of the sensor diaphragm that is opposite the first side. A notch is formed in an exposed and uninsulated side of at least one of the sensing layer and the backing layer assembly. The notch defines a gap between electrically conductive side edges of the pressure sensor that provides electrical insulation from voltage arcing between the electrically conductive side edges. A pedestal includes a bottom surface that is bonded to a top surface of the backing layer assembly. The first electrically insulative layer electrically insulates the sensing layer from the pedestal and the header.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
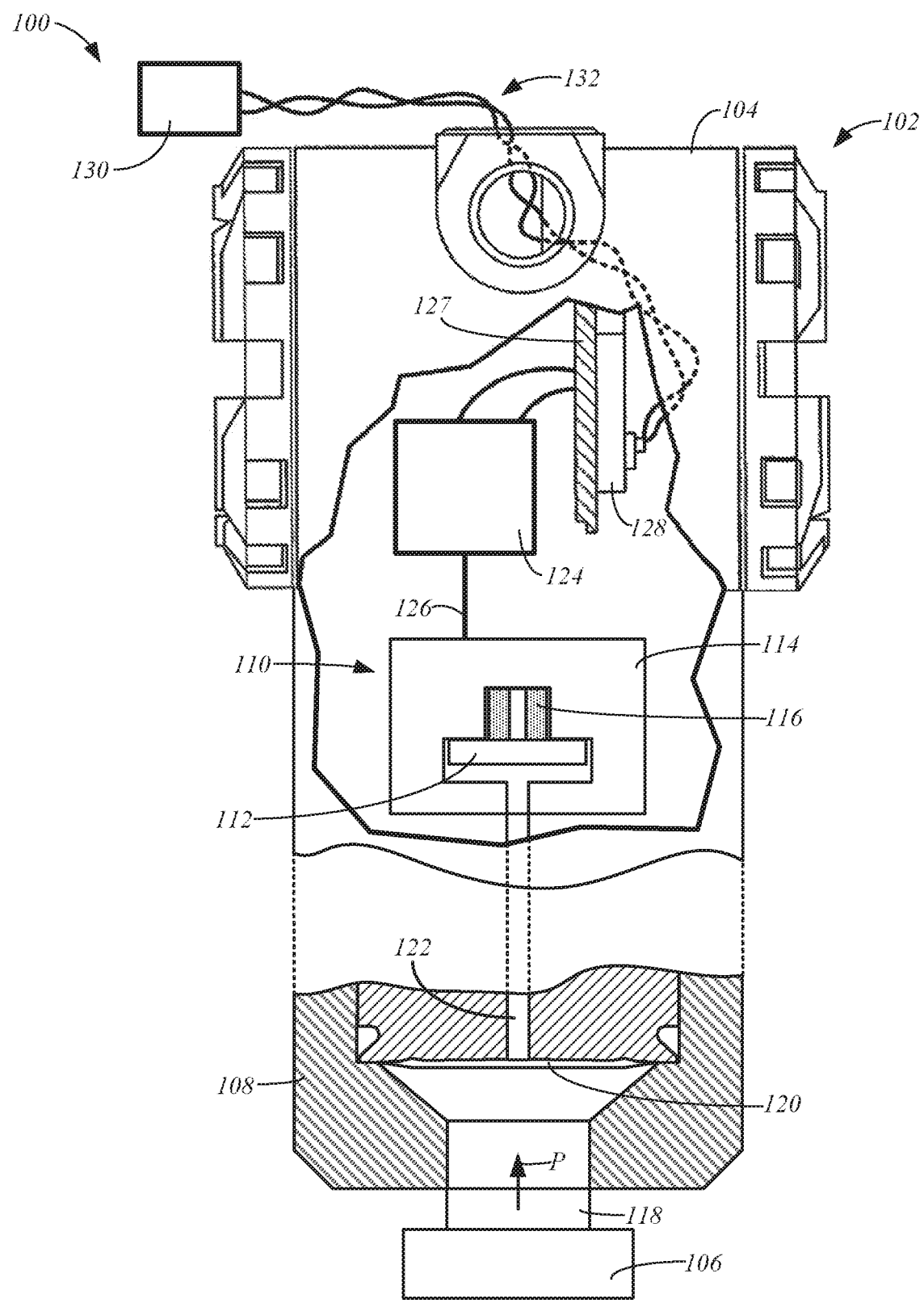
FIG. 1 is a partial cutaway and cross-sectional view of an example of a pressure transmitter in a process control or measurement system, in accordance with embodiments of the present disclosure.

Embodiments of the present disclosure are described more fully hereinafter with reference to the accompanying drawings. Elements that are identified using the same or similar reference characters refer to the same or similar elements. Some elements may not be shown in each of the figures in order to simplify the illustrations.

The various embodiments of the present disclosure may be embodied in many different forms and should not be construed as limited to the specific embodiments set forth herein. Rather, these embodiments are provided so that this disclosure will be thorough and complete, and will fully convey the scope of the present disclosure to those skilled in the art.

Figure 2:
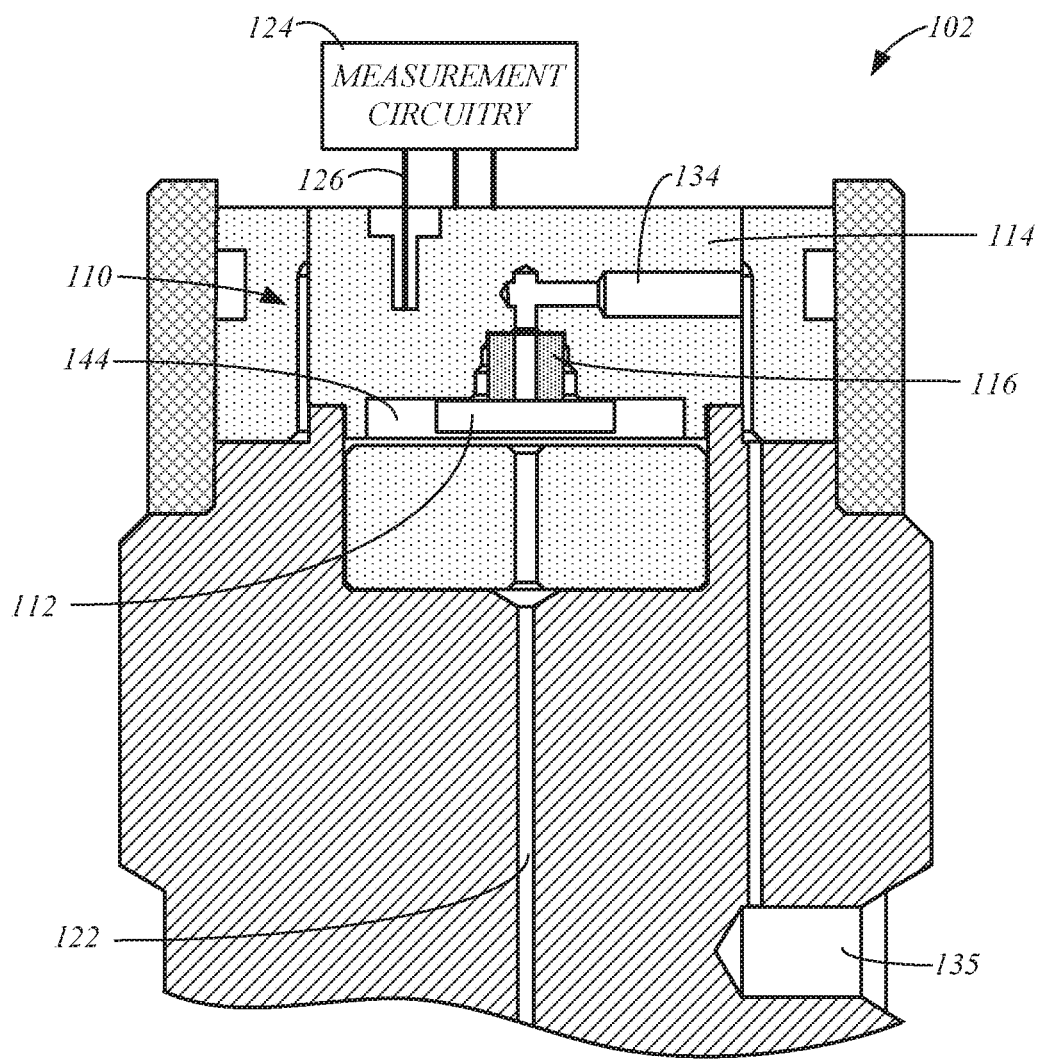
FIG. 2 is a cross-sectional view of a portion of the pressure transmitter of FIG. 1, in accordance with embodiments of the present disclosure.

FIG. 1 is a partial cutaway and cross-sectional view of an example of a process control or measurement system 100 that includes a pressure transmitter 102, in accordance with embodiments of the present disclosure. FIG. 2 is a cross-sectional view of a portion of the transmitter 102 of FIG. 1. The system 100 may be used in the processing of a material (e.g., process medium) to transform the material from a less valuable state into more valuable and useful products, such as petroleum, chemicals, paper, food, etc. For example, the system 100 may be used in an oil refinery that performs industrial processes that can process crude oil into gasoline, fuel oil, and other petrochemicals.

The pressure transmitter 102 may include a housing 104 that may be coupled to an industrial process 106 through a process coupling 108. The housing 104 and the process coupling 108 may be formed of stainless steel or another suitable material. The transmitter 102 includes a pressure sensor assembly 110 that is attached to and/or contained within the housing 104. The assembly 110 includes a pressure sensor or pressure sensor die 112 (hereinafter "pressure sensor") formed in accordance with one or more embodiments described herein for measuring a pressure of the process. The pressure sensor assembly 110 may include a header 114 and a pedestal 116 that connects the pressure sensor 112 to the header 114, as best shown in FIG. 2.

The process coupling 108 may be connected to a pipe 118 that is connected to the process 106 and contains a process material (e.g., a fluid) at a pressure P that is to be measured by the pressure sensor 112. The process coupling 108 may include an isolation diaphragm 120 for use in communicating the pressure P to the pressure sensor 112 without exposing the pressure sensor 112 to the process material, as shown in FIG. 1. The isolation diaphragm 120 seals an end of a fluid pathway 122 that extends through the header 114 and to a cavity 144 containing the pressure sensor 112. As the pressure P is applied from the process material, the isolation diaphragm 120 exerts the pressure against a fill fluid contained in the fluid pathway 122 such that the pressure P is transferred through the fill fluid to the pressure sensor 112 for measurement.

The pressure sensor 112 includes a sensor element having an electrical parameter that is indicative of the applied pressure P. Measurement circuitry 124 may detect and process the electrical parameter of the sensor element through a suitable electrical connection 126 to establish a value for the sensed pressure P. The measurement circuitry 124 may be connected to a terminal block 127 of the transmitter 102 having communications circuitry 128 for communicating information relating to the sensed pressure P, such as a value of the pressure P, to an external computerized control unit 130 through a process control loop 132, as indicated in FIG. 1.

The pressure transmitter 102 may include a path 134 for connecting the sensor 112 to ambient pressure or air, such as through a vent 135 in the housing 104, as shown in FIG. 2. The path may extend through the pedestal 116.

In some embodiments, the process control loop 132 includes a physical communication link, such as a two-wire control loop, as shown in FIG. 1, and/or a wireless communication link. Communications between the control unit 130, or another external computing device, and the pressure transmitter 102 may be performed over the control loop 132 in accordance with conventional analog and/or digital communication protocols. In some embodiments, the two-wire control loop 132 includes a 4-20 milliamp control loop, in which the measured pressure value may be represented by a level of a loop current flowing through the two-wire control loop 132. Exemplary digital communication protocols include the modulation of digital signals onto the analog current level of the two-wire control loop 132, such as in accordance with the HART® communication standard. Other purely digital techniques may also be employed including FieldBus and Profibus communication protocols.

Exemplary wireless versions of the process control loop 132 include, for example, a wireless mesh network protocol, such as WirelessHART® (IEC 62591) or ISA 100.11a (IEC 62734), or another wireless communication protocol, such as WiFi, LoRa, Sigfox, BLE, or any other suitable protocol.

Power may be supplied to the pressure transmitter 102 from any suitable power source. For example, the pressure transmitter 102 may be wholly powered by the current flowing through the control loop 132. One or more power supplies may also be utilized to power the pressure transmitter 102, such as an internal or an external battery. An electrical power generator (e.g., solar panel, a wind power generator, etc.) may also be used to power the pressure transmitter, or charge a power supply used by the pressure transmitter 102.

Figure 3:
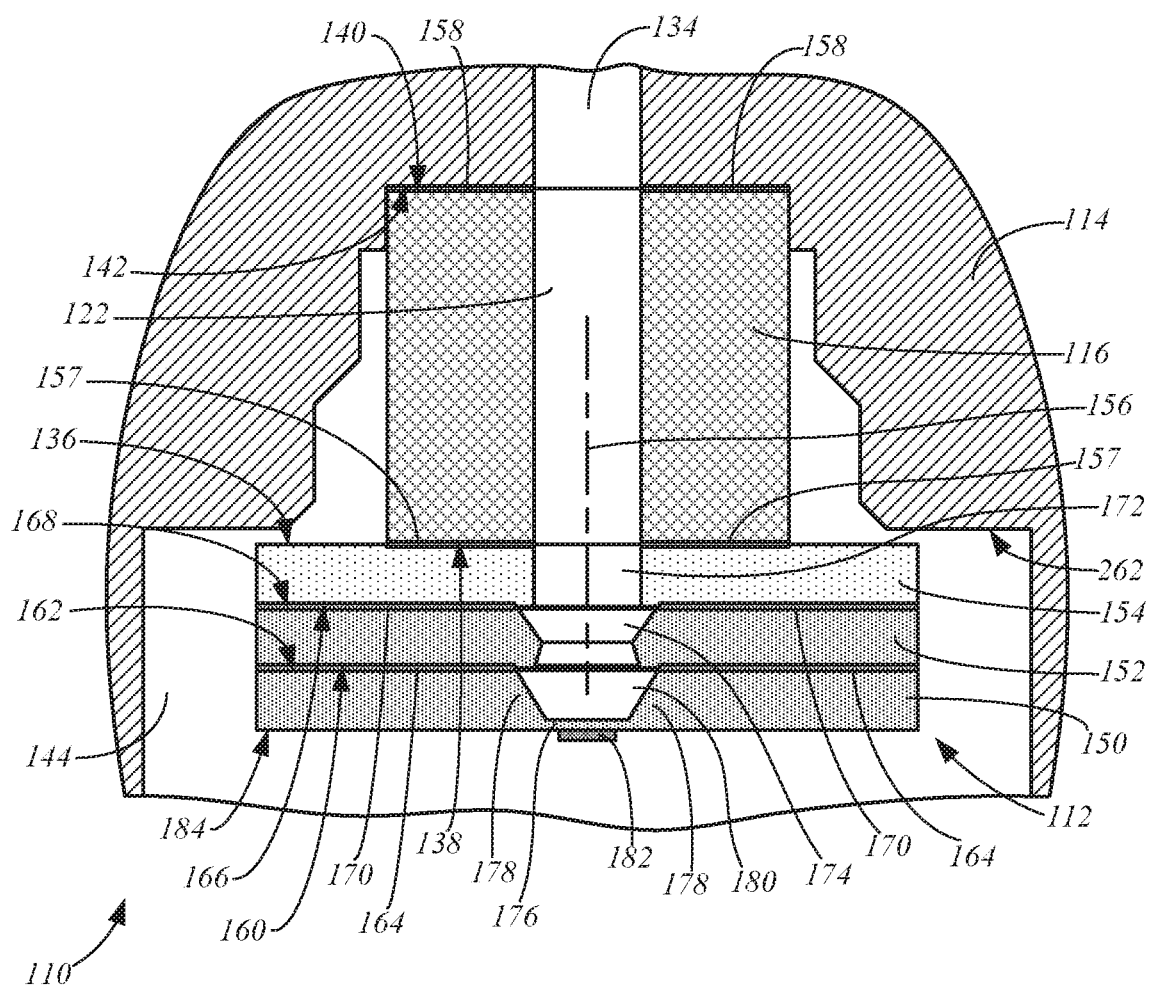
FIG. 3 is a simplified cross-sectional view of a portion of a pressure sensor assembly, in accordance with embodiments of the present disclosure.

FIG. 3 is a simplified cross-sectional view of a portion of a pressure sensor assembly 110, such as a gauge pressure assembly, in accordance with embodiments of the present disclosure. The pressure sensor assembly 110 includes the pressure sensor 112 formed in accordance with embodiments of the present disclosure, which is attached to the electrically conductive header 114 (e.g., stainless steel) through the pedestal 116. A top surface 136 of the pressure sensor 112 attaches to a bottom surface 138 of the pedestal 116, and a top surface 140 of the pedestal 116 attaches to a surface 142 of the header 114, such as within the cavity 144 of the header 114.

In order to protect and ensure proper operation of the pressure sensor 112, it is necessary to electrically isolate the pressure sensor 112 from the header 114, the housing 104 and the process coupling 108, which may be electrically conductive. Conventional techniques for providing such electrical isolation of the pressure sensor 112 generally require the use of an electrically insulative pedestal 116 that blocks electrical charges and currents from the header 114 from reaching the pressure sensor 112. For example, the pedestal 116 may include at least a portion formed of ceramic or another electrically insulative material that electrically isolates the pressure sensor 112 from the header 114. However, such a configuration can lead to high stresses in the junction of the electrically insulative pedestal 116 and the pressure sensor 112 due to substantially non-matching thermal expansion coefficients of the materials.

Some embodiments of the present disclosure relate to an improved pressure sensor design having integrated electrical isolation features. Some of the electrical isolation features may be implemented at the wafer stack assembly stage, resulting in significant reductions in cost and complexity, while providing improved quality. Additional advantages of some embodiments include pressure sensor geometries that provide enhanced stress isolation, and other advantages.

One embodiment of the pressure sensor 112 includes an electrically conductive sensing layer 150, an electrically conductive backing layer 152, and an electrically insulative layer 154, as shown in FIG. 3. In some embodiments, the conductive sensing layer 150 and the conductive backing layer 152 each comprise crystalline silicon and may be formed in separate wafers. The electrically insulative layer 154 electrically isolates the sensing layer 150 from the pedestal 116 and the header 114. The electrically insulative layer 154 may be formed of or include glass, ceramic, borosilicate glass, silicon nitride, silicon dioxide or aluminum nitride ceramic, for example, and may also be formed in a wafer. In some embodiments, each of the layers 150, 152 and 154 has a thickness that is measured along an axis 156 of the pressure sensor that may be less than 20 mils, such as 12.5 mils.

Due to the electrical isolation built into the pressure sensor 112, it is not necessary for the pedestal 116 to provide the electrical isolation function in accordance with conventional pedestals 116. Some embodiments take advantage of this to reduce stresses at the junction between the pedestal 116 and the header 114, and the junction between the pedestal 116 and the pressure sensor 112. In some embodiments, the pedestal 116 is formed of an electrically conductive material, such as Kovar® or another suitable conductive material, and includes a substantially planar surface 138 that is bonded to a substantially planar surface 136 of the electrically insulative layer 154, as shown in FIG. 3. Preferably, the electrically insulative layer 154 is formed of a material, such as those mentioned above, having a similar coefficient of thermal expansion as the material forming the pedestal 116, to further reduce the likelihood of significant stresses developing at their junction. In some embodiments, a bond 157 between the surface 136 of the electrically insulative layer 154 and the surface 138 of the pedestal 116 may be formed by a solder joint or another suitable bond. A bond 158 between the pedestal 116 and the header 114 may comprise a braze joint, or another suitable bond.

The electrically conductive backing layer 152 has a bottom surface 160 that is bonded to a top surface 162 of the sensing layer 150 by a bond 164, and the electrically insulative layer 154 has a bottom surface 166 that is bonded to a top surface 168 of the backing layer 152 by a bond 170. The bonds 164 and 170 may include glass frit bonds, which may include an electrically insulative material on the surfaces to be joined (e.g., thermally grown silicon dioxide), and may increase the electrical isolation of the sensing layer 150 from the pedestal 116 and the header 114. Alternatively, the bonds 164 and 170 may comprise a thermocompression bond, a fusion bond, an anodic bond, or another suitable bond.

In some embodiments, the bond 170 between the backing layer 152 and the electrically insulative layer 154 seals (e.g., hermetically seals) the junction of a pathway 172 through the electrically insulative layer 154 and a pathway 174 through the backing layer 152. Additionally, the bond 157 between the electrically insulative layer 154 and the pedestal 116 (e.g., solder joint) also seals (e.g., hermetically seals) the junction of the fluid pathway 134 through the pedestal 116, and the fluid pathway 172 through the electrically insulative layer 154.

The sensing layer 150 is configured to sense the pressure P using a sensor diaphragm 176 that extends between perimeter support regions 178. The sensor diaphragm 176 has a reduced thickness measured along the axis 156 of the sensor 112 relative to the perimeter support regions 178. A cavity 180 is formed in the sensing layer 150 between the perimeter support regions 178 and the sensor diaphragm 176. The bond 164 between the backing layer 152 and the sensing layer 150 seals (e.g., hermetically seals) the pathway 174 to a cavity 180. Thus, the cavity 180 may be exposed to ambient pressure through the pathway 134, while the cavity 144 on the opposing side of the sensor diaphragm 176 is exposed to the process pressure P communicated by the fill fluid through the fluid pathway 122 (FIG. 1).

The sensor diaphragm 176 flexes or deflects in response to the pressure difference between the pressure P within the cavity 144 and the pressure within the cavity 180. A known relationship between the deflection of the diaphragm 176 and the pressure P is used to measure the pressure P.

In one embodiment, a sensor element 182 is used to detect the deflection of the sensor diaphragm 176 and thereby detect the pressure P. The sensor element 182 may be mounted within or on the sensor diaphragm 176, such as on a surface 184 of the sensing layer 150, as indicated in FIG. 3, and has an electrical parameter that changes based on the deflection of the sensor diaphragm 176. The measurement circuitry 124 may detect or receive a measurement of the electrical parameter of the sensor element 182 through the electrical connection 126.

In some embodiments, the sensor element 182 may comprise one or more strain gauges. As the sensor diaphragm 176 deflects in response to the process pressure P within the cavity 180, an electrical parameter of the strain gauge (e.g., in resistance) changes and is representative of the process pressure P.

FIGS. 4A-D are simplified side cross-sectional views illustrating an example of a method of producing the pressure sensor 112 and the pressure sensor assembly 110, in accordance with embodiments of the present disclosure. In some embodiments, the sensing layer 150, the backing layer 152 and the electrically insulative layer 154 may each be formed in their respective wafers, as indicated in phantom lines. Additionally, multiple formations of the sensing layer 150, the backing layer 152 and the electrically insulative layer 154 may be formed in each wafer to allow for mass production of the sensors. The features of the layers 150, 152 and 154 may be formed in the wafers using conventional etching, or other suitable techniques.

Figure 4A:
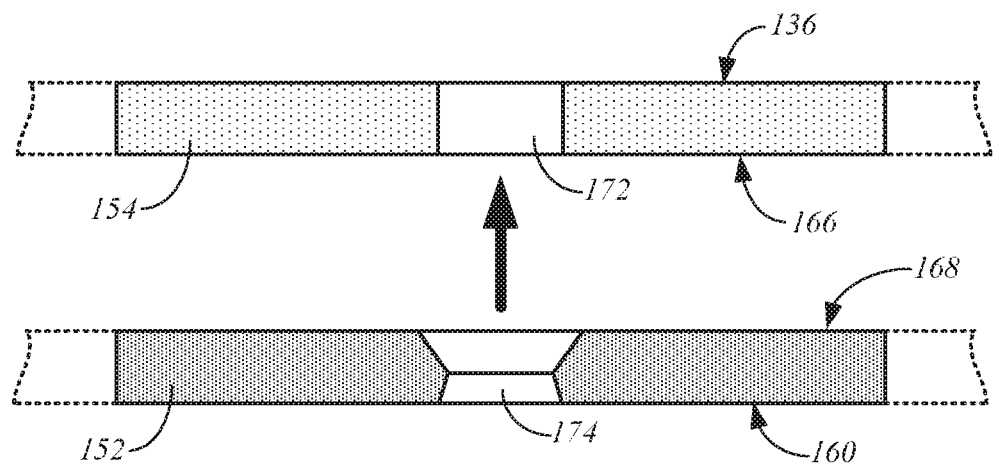
FIGS. 4A-D are simplified side cross-sectional views illustrating steps of a method of producing a pressure sensor and a pressure sensor assembly, in accordance with embodiments of the present disclosure.
Figure 4B:
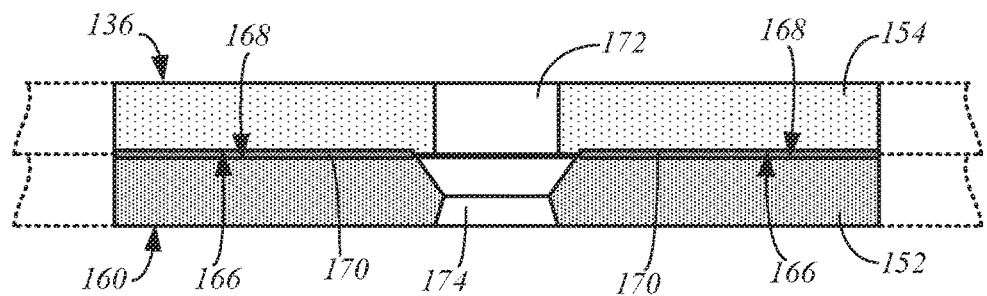

As indicated in FIG. 4A, the backing layer 152 and the electrically insulative layer 154 may be provided with the pathway 174 of the backing layer 152 aligned with the pathway 172 of the electrically insulative layer 154. The surface 168 of the backing layer 152 is then bonded to the surface 166 of the electrically insulative layer 154 by the bond 170, as indicated in FIG. 4B. As mentioned above, the bond 170 seals the junction between the pathway 174 of the backing layer 152 and the pathway 172 of the electrically insulative layer 154.

Figure 4C:
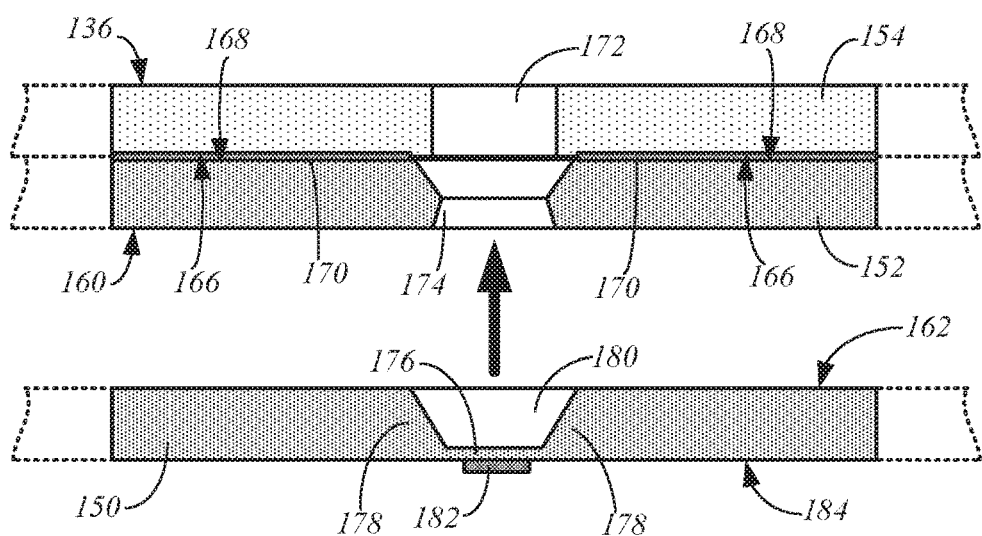

The sensing layer 150 may be positioned such that the cavity 180 is aligned with the pathway 174 of the backing layer 152, as indicated in FIG. 4C. The surface 162 of the sensing layer 150 is then bonded to the surface 160 of the backing layer 152 using the bond 164 to form the pressure sensor 112 shown in FIG. 4D. In some embodiments, the bond 164 seals the junction between the pathway 174 of the backing layer 152 and the cavity 180.

Embodiments of the method are not limited to the particular order described above. For example, the sensing layer 150 could be bonded to the backing layer 152 prior to bonding the backing layer 152 to the electrically insulative layer 154. Other adjustments may also be made.

Figure 4D:
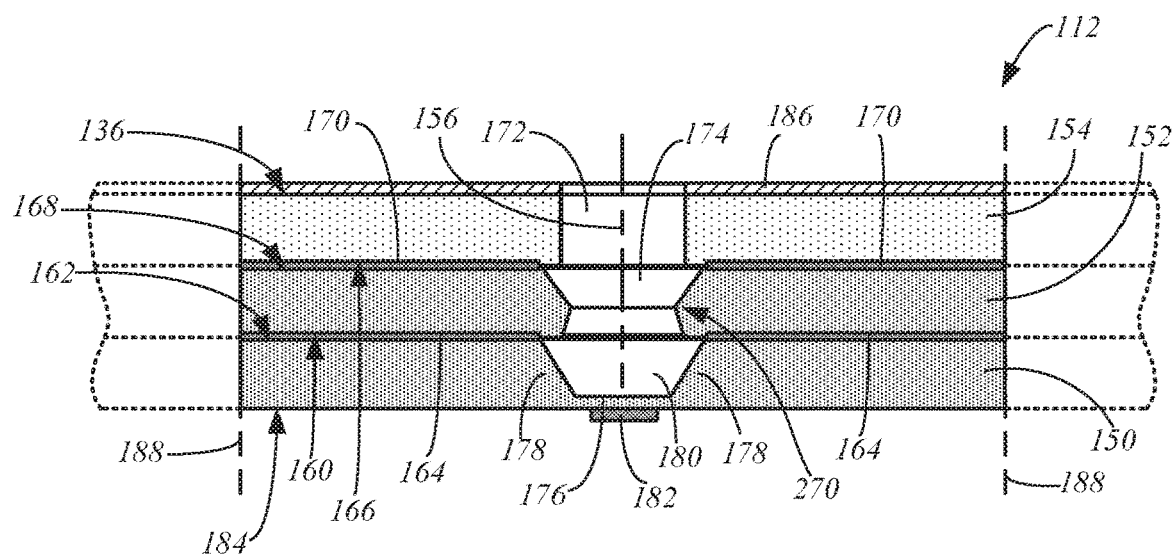

In some embodiments of the method, a metal layer 186 is formed on the surface 136 of the electrically insulative layer 154, as shown in FIG. 4D. The metal layer 186 may comprise solder for attaching the surface 136 of the electrically insulative layer 154 to the surface 138 of the pedestal 116, as shown in FIG. 3. The pressure sensor assembly 110 (FIG. 3) may then be completed by connecting the pedestal 116 to the header 114, such as by forming the bond (e.g., braze joint) 158 between the surface 140 of the pedestal 116 and the surface 142 of the header 114.

When, the pressure sensor 112 shown in FIG. 4D is one of a plurality of pressure sensors formed in the stack of the wafers, each of the pressure sensors 112 may be cut from the stack of the wafers using a suitable die cutting process that cuts along lines 188 to separate the individual pressure sensors 112 from the stack of wafers.

Figure 5:
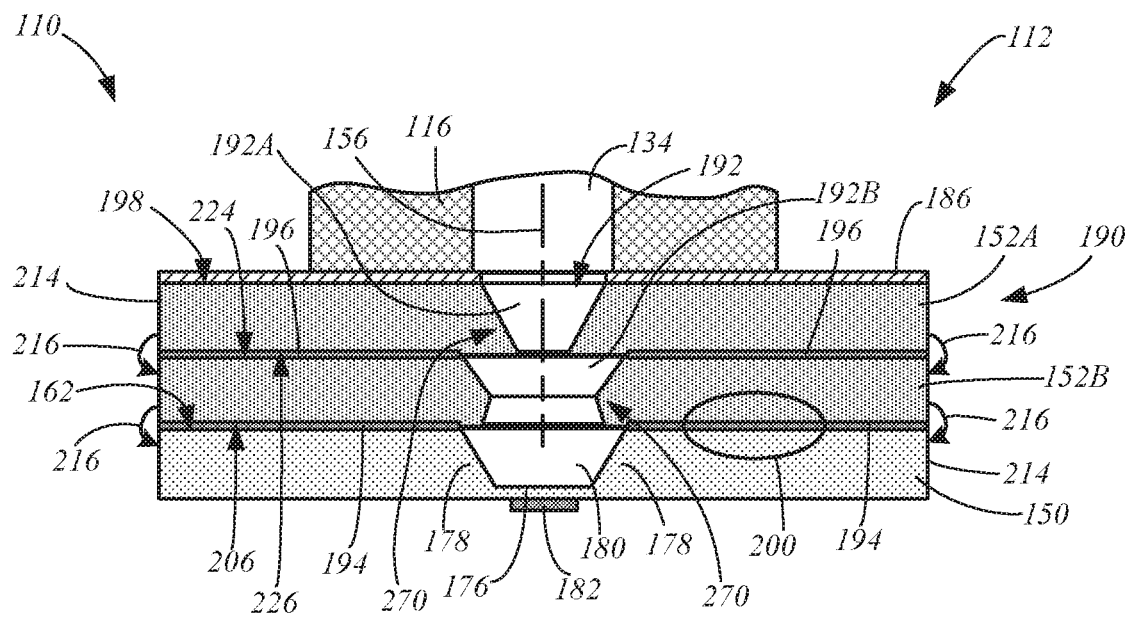
FIG. 5 is a simplified cross-sectional view of an example of a pressure sensor and a pressure sensor assembly, in accordance with embodiments of the present disclosure.

FIG. 5 is a simplified cross-sectional view of another example of a pressure sensor 112 and a pressure sensor assembly 110, in accordance with embodiments of the present disclosure. The pressure sensor 112 includes an electrically conductive sensing layer 150, which may include one or more features described above, and a backing layer assembly 190 comprising one or more electrically conductive backing layers 152, such as backing layers 152A and 152B. As discussed above, these layers may comprise crystalline silicon and may be formed in separate wafers. Additionally, multiple pressure sensors 112 may be formed simultaneously through the stacking and bonding of the wafers, as discussed above.

A pathway 192 extends through the backing layer assembly 190 and connects with the cavity 180. In the example shown in FIG. 5, the pathway 192 through the backing layer assembly includes a pathway 192A through the electrically conductive backing layer 152A and a pathway 192B through the electrically conductive backing layer 152B. Junctions along the pathway 192 may be sealed by the bonds 194 and 196 connecting the layers together.

A surface 198 of the backing layer assembly 190, such as the top surface of the electrically conductive backing layer 152A, may be configured to connect to the pedestal 116 using any suitable technique. In one embodiment, a metal layer 186, such as a layer of solder, is formed on the surface 198 of the backing layer assembly 190 and is used to attach the pressure sensor 112 to the pedestal 116, as indicated in FIG. 5. The pedestal 116 may then be attached to the header 114 (FIG. 3), as discussed above with regard to the pressure sensor 112.

In some embodiments, the pressure sensor 112 does not rely upon an electrically insulative layer, such as the layer 154 of the pressure sensor 112 (FIG. 3), for electrical isolation of the sensing layer 150 and/or sensor element 182. Rather, electrical isolation of the sensing layer 150 or the sensor element 182 is provided by the bond 194 formed between the sensing layer 150 and the backing layer assembly 190, and/or a bond between layers of the backing layer assembly 190, such as the bond 196 between the backing layer 152A and the backing layer 152B.

Figure 6:
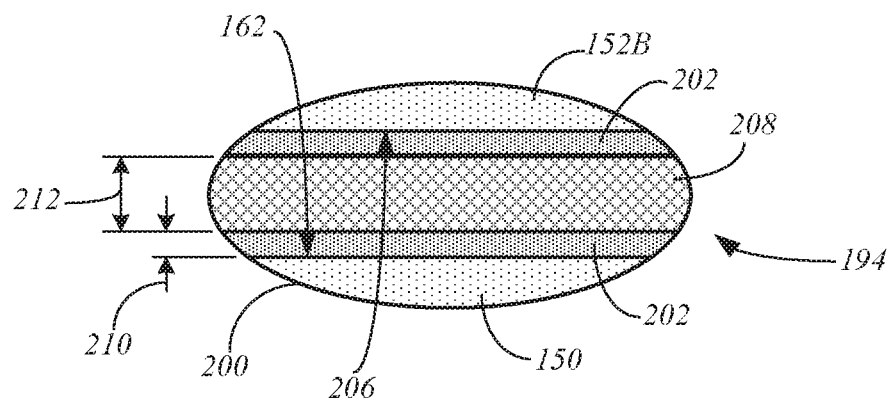
FIG. 6 is a magnified view of a portion of FIG. 5 illustrating an example of an electrically insulative bond, in accordance with embodiments of the present disclosure.

FIG. 6 is a magnified view of the portion 200 of FIG. 5, and illustrates an example of an electrically insulative bond 194, in accordance with embodiments of the present disclosure. In one embodiment, the electrically insulative bond 194 comprises layers or coatings 202 of an electrically insulative material, such as thermally grown silicon dioxide, on the surface 162 of the sensing layer 150 and the surface 206 of the backing layer 152B, and a glass layer 208 between the coatings 202 for forming the bond (e.g., glass frit bond) with the coatings 202 and the surfaces 162 and 206. A glass frit bond 194 may be used to fuse the glass layer 208 to the coatings 202 and seal the junction of the pathway 192B and the cavity 180. A similar technique may be used to form the bond 196 between the backing layers 152A and 152B.

In some embodiments, the coatings 202 may each have a thickness 210 measured along the axis 156 of the pressure sensor 112 of approximately 0.1 mils, and the glass layer 208 may have a thickness 212 of approximately 0.6 mils. Thus, the thickness of the electrically insulative bond 194 or 196 may be approximately 0.8 mils.

While the one or more electrically insulative bonds may block an electrical charge from being conducted from the pedestal 116 to the sensing layer 150 or sensor element 182, the thickness of each electrically insulative bond 194, 196 may not provide a sufficient gap between the uninsulated and exposed side surfaces 214 of the pressure sensor 112, such as after the sensor 112 is die cut from a wafer stack, to prevent electrical arcing (high-potential failure) around the bonds, as indicated by the arrows 216 in FIG. 5. For typical voltages that may be applied to the pressure sensor 112 from the header 114 and the pedestal 116, a gap of approximately 5 mils between the conductive surfaces 214 is necessary to prevent such electrical arcing. Thus, the electrically insulating bonds 194 and 196 may not provide sufficient protection for the sensing layer 150 or the sensor element 182 from high-potential failures.

FIGS. 7-11 are simplified cross-sectional views of pressure sensor assemblies 110 and pressure sensors 112 that include features for preventing electrical arcing between the uninsulated sides 214 of the pressure sensor 112, in accordance with embodiments of the present disclosure. In some embodiments, a groove or notch 220 is formed in the exposed and uninsulated side surface or surfaces 214 of the sensing layer 150 and/or the backing layer assembly 190. The notch 220 extends around the perimeter of the pressure sensor 112 and defines a gap 222 extending along the axis 156 that is sufficient to prevent electrical arcing between the electrically conductive side surfaces 214. For example, the gap 222 may extend a distance along the axis of greater than 5 mils, such as 8 mils or 10 mils, as shown in FIGS. 8-12.

Figure 7:
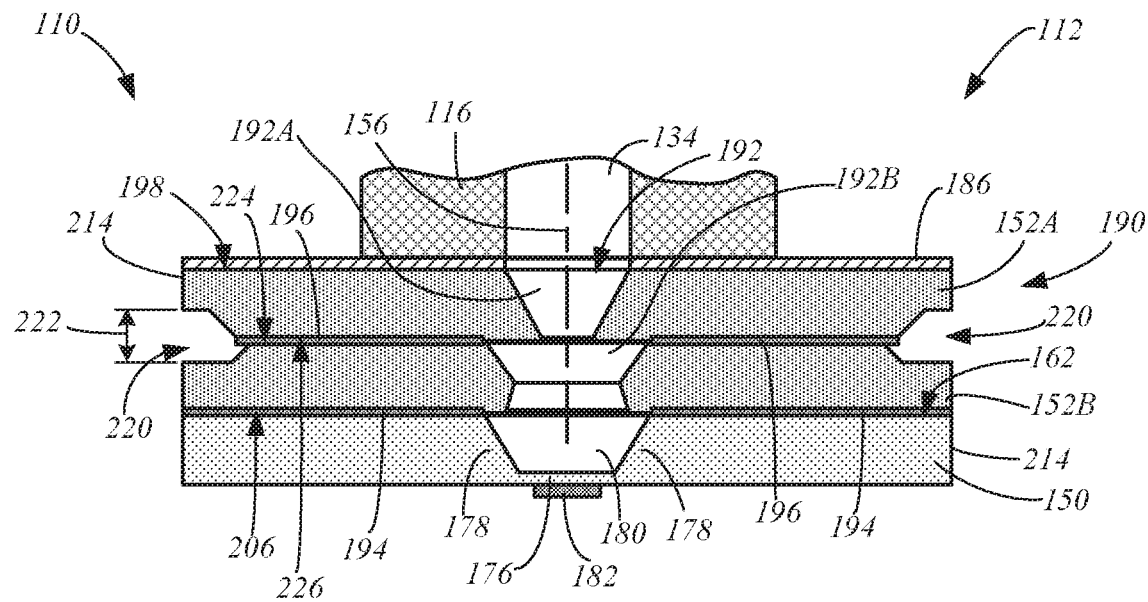
FIGS. 7-11 are simplified cross-sectional views of pressure sensor assemblies and pressure sensors, in accordance with embodiments of the present disclosure.

The notch 220 may be formed in the sensing layer 150 and/or one or more of the backing layers 152 of the backing layer assembly 190 using any suitable technique, such as with a potassium-hydroxide (KOH) wet etching process. For example, the notch 220 may be formed in the adjoining backing layers 152A and 152B of the backing layer assembly, as shown in FIG. 7. This may be a preferred location for the notch when the backing layers 152 are formed of relatively thin wafers, such as wafers having a thickness of less than 20 mils, such as 12.5 mils, for example.

Figure 8:
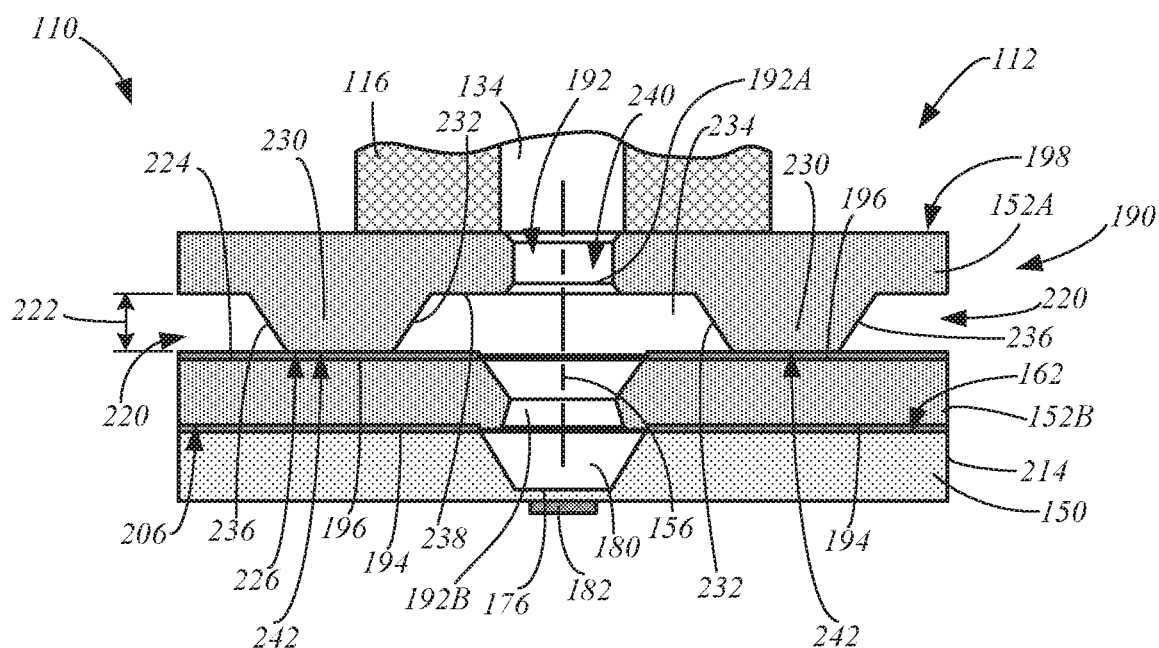
Figure 9:
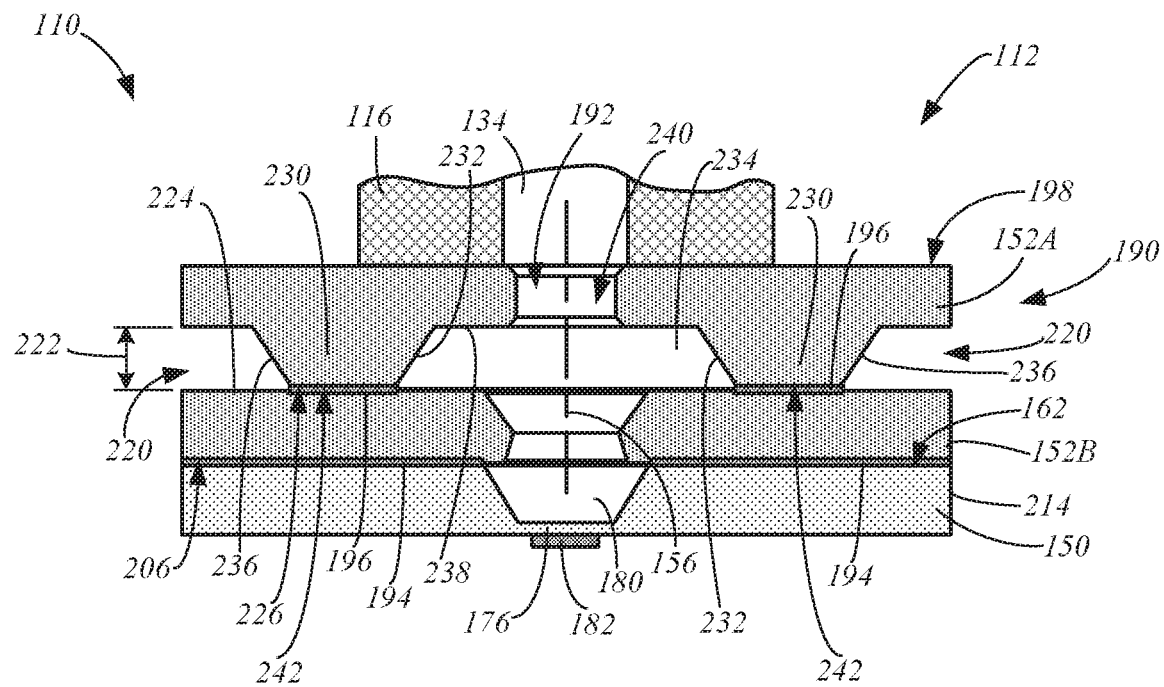
Figure 10:
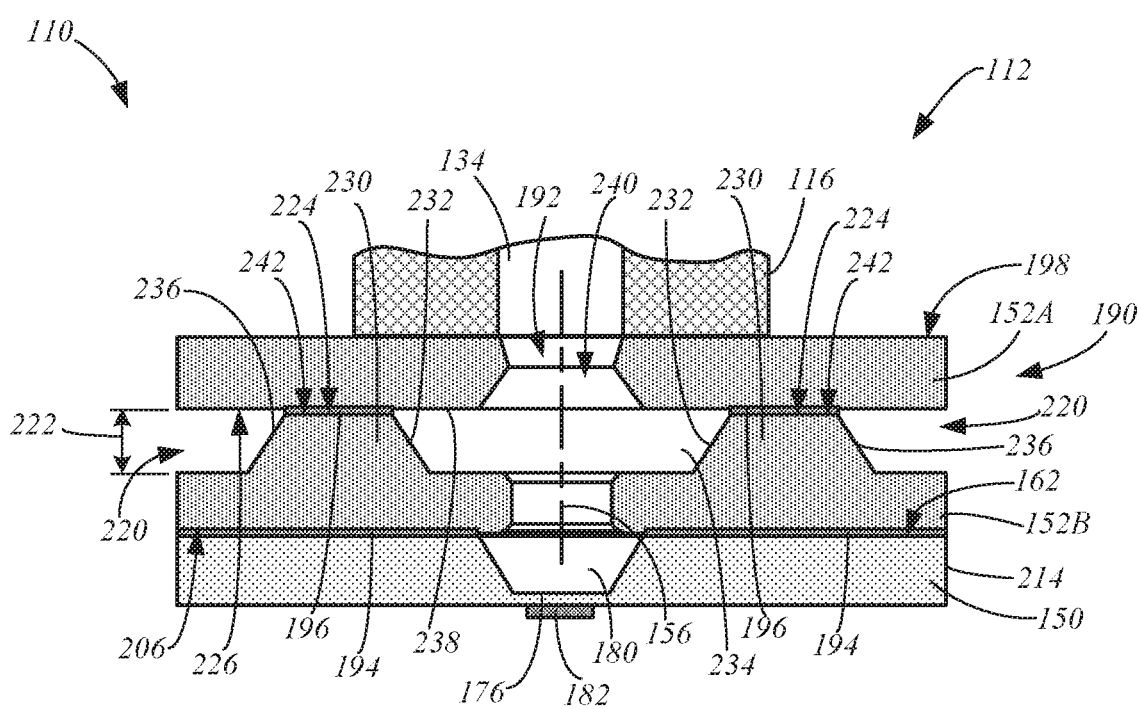

FIGS. 8-10 illustrate examples of the pressure sensor 112 in which the notch 220 is formed in a single backing layer 152A or 152B of the backing layer assembly 190. In some embodiments, the backing layer 150 containing the notch 220 has a thickness of greater than 12.5 mils, such as 20 mils or 35 mils, for example. In FIGS. 8 and 9, the notch is formed in the lower backing layer 152A that attaches to the pedestal 116, and in FIG. 10, the notch 220 is formed in the upper backing layer 152B that attaches to the sensing layer 150.

In some embodiments, the insulating bond 196 between the backing layers 152A and 152B may extend across the larger of the adjoining surfaces, such as the bottom surface 224 of the backing layer 152B, as shown in FIG. 8. Alternatively, the bond 196 may extend across the shorter of the adjoining surfaces and does not extend over the larger of the adjoining surfaces. For example, the bond 196 may extend over the surface 226 of the backing layer 152A, as shown in FIG. 9, or the surface 224 of the backing layer 152B, as shown in FIG. 10.

Figure 11:
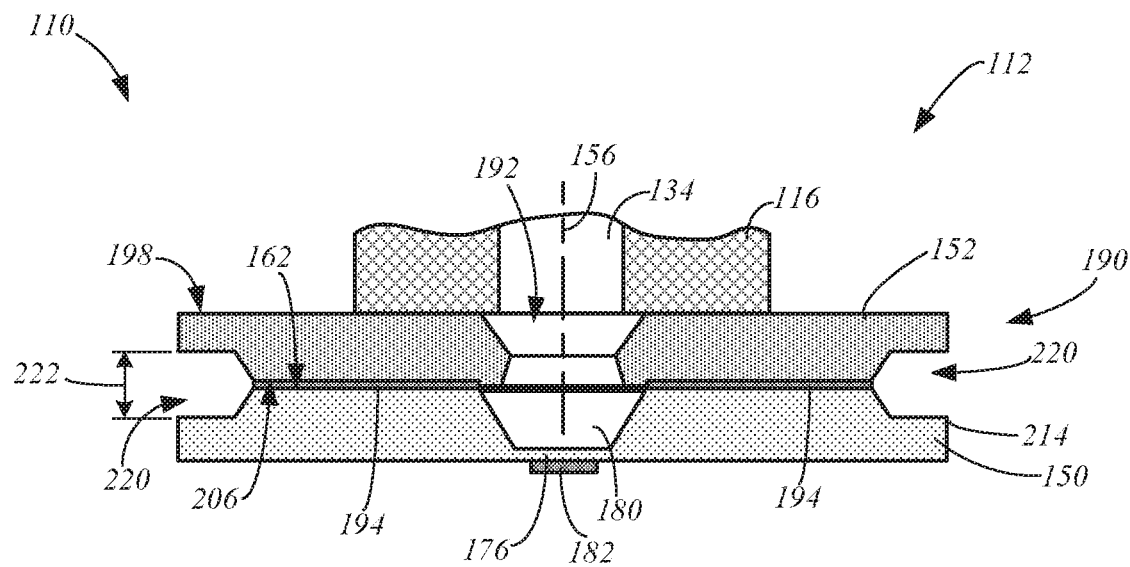

FIG. 11 is a simplified cross-sectional view of a pressure sensor assembly 110 that includes a pressure sensor 112 having a notch 220 that extends between the sensing layer 150 and the backing layer assembly 190. Here, the backing layer assembly 190 includes a single conductive backing layer 152. An electrically insulative bond 194 joins the bottom surface 162 of the sensing layer 150 to the surface 206 of the backing layer 152. The thickness of the sensing layer 150 and the thickness of the backing layer 152 measured along the axis 156 may be approximately 10-15 mils, such as 12.5 mils, for example.

Additional embodiments of the present disclosure relate to pedestal structures in one or more layers of the pressure sensor 112, such as an electrically insulative layer (e.g., layer 154 of the pressure sensor of FIG. 3) or an electrically conductive backing layer (e.g., layer 152A or 152B). The pedestal structures provide stress isolation to the sensing layer 150 by reducing a contact area between adjoining layers of the pressure sensor 112. This reduces the likelihood of harmful stresses reaching the sensing layer 150 that may adversely affect its operation. Each of the pedestal structures may be formed through wet etching or another suitable technique.

In some embodiments, the pedestal structures within a layer include a wall that surrounds the axis 156 of the pressure sensor 112 and an opening of the pathway extending through the layer, and defines a cavity of the pathway. The wall reduces the contact area between adjoining layers of the pressure sensor 112 and assists in providing stress isolation to the sensing layer 150.

One example of this wall feature is shown in the pressure sensors 112 of FIGS. 8 and 9, in which the backing layer 152A includes a wall 230 that extends vertically along the axis 156 from the top surface 198 to the bottom surface 226 of the backing layer 152A. The wall 230 surrounds the axis 156, and includes an interior surface 232 that defines a boundary of a cavity 234 of the pathway 192A through the backing layer 152A. An exterior surface 236 of the wall 230 may define an interior surface of the notch 220.

In some embodiments, a surface 238 extends from the wall 230 to an opening 240 of the pathway 192A. A contact area 242 is formed on the wall 230 and engages or is joined to the adjoining layer of the pressure sensor 112, which, in this example, is the backing layer 152B, through the corresponding bond 196. The small contact area 242 between the backing layer 152A and the backing layer 152B through the bond 196 isolates stresses that may develop in the backing layer 152A due to its attachment to the pedestal 116, and reduces the transfer of those stresses to the sensing layer 150.

Additional examples of the wall feature are shown in FIG. 10, in which the wall 230 is formed in the backing layer 152B and the small contact surface 242 is formed at the surface 224.

Figure 12:
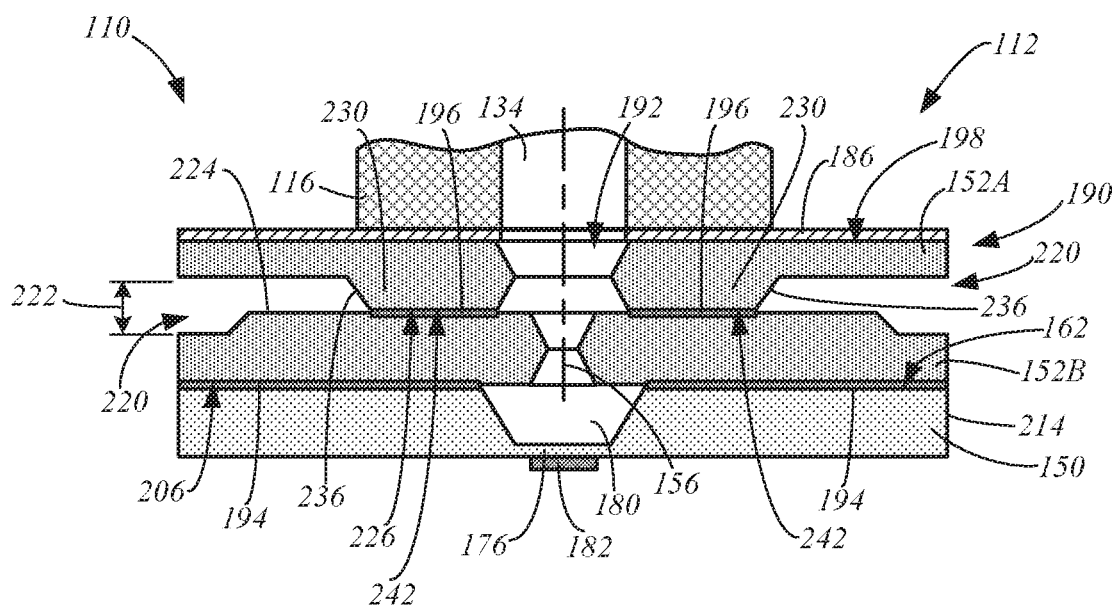
FIG. 12 is a cross-sectional view of a sensor assembly, in accordance with embodiments of the present disclosure.
Figure 13:
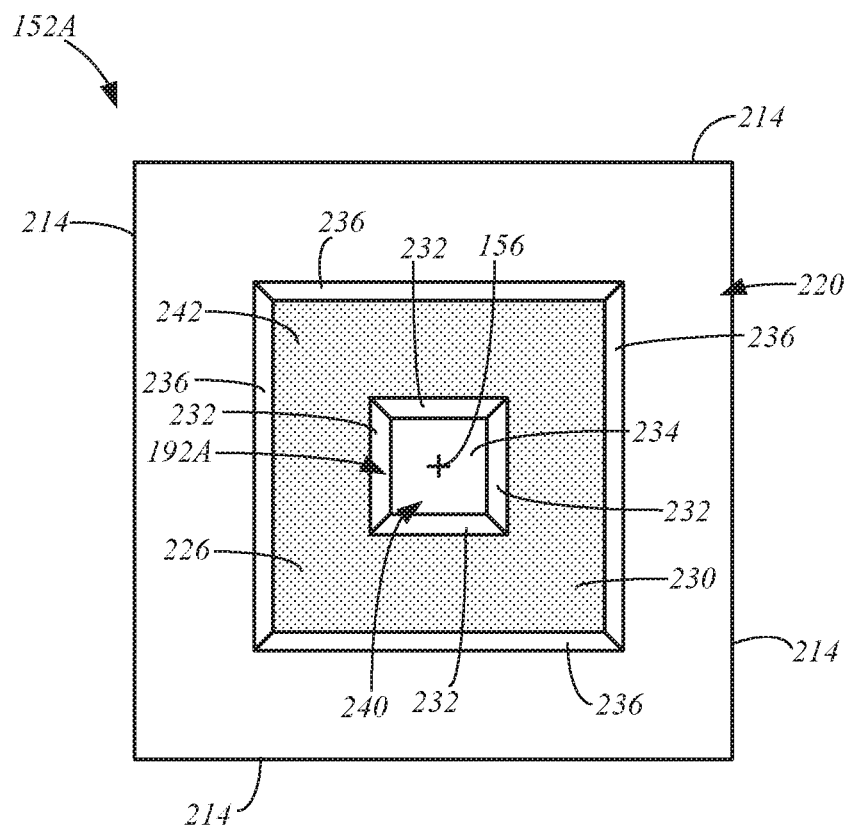
FIG. 13 is a bottom plan view of a backing layer of the sensor assembly of FIG. 12, in accordance with embodiments of the present disclosure.

FIGS. 12 and 13 respectively are a cross-sectional view of a pressure sensor assembly 110 and a bottom plan view of a backing layer 152A of the assembly 110 of FIG. 12, in accordance with embodiments of the present disclosure. Here, the notch 220 penetrates the side surface 214 of the backing layer 152A a farther distance toward the axis 156 than in the examples shown in FIG. 7. This results in the formation of a wall 230 that operates similarly to the walls discussed above. For example, the wall 230 extends from the surface 198 to the surface 196 of the backing layer 152A, and the surface 196 has a reduced contact area 242 with the surface 224 of the adjoining backing layer 152B through the bond 196, which may be an electrically insulative bond, relative to the example shown in FIG. 8.

Figure 14:
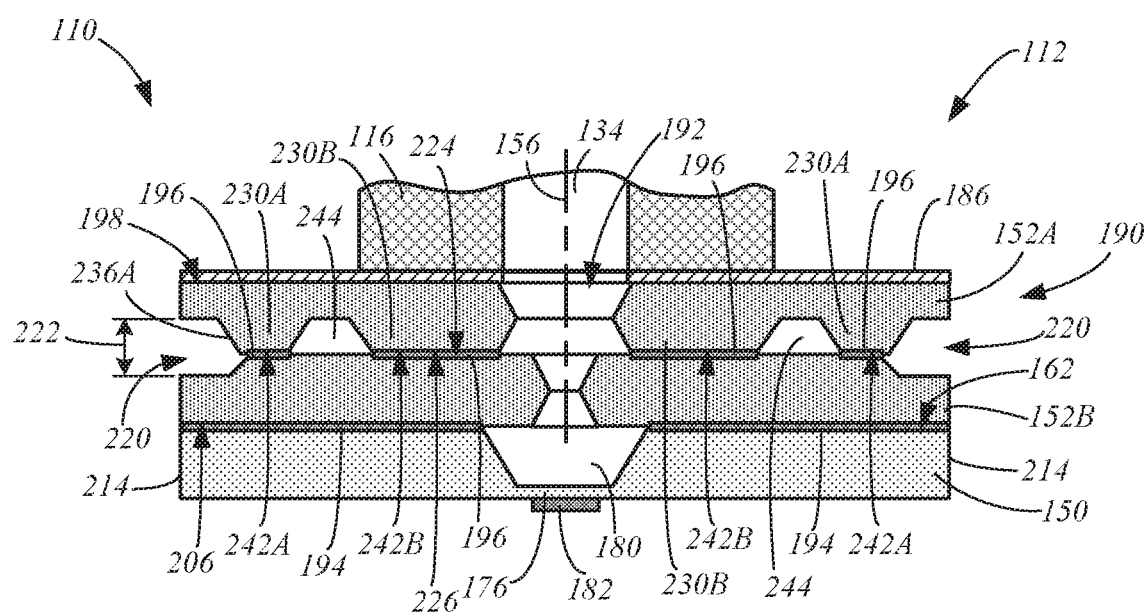
FIGS. 14 and 15 respectively are a cross-sectional view of a pressure sensor assembly and a bottom plan view of a backing layer of the pressure sensor assembly of FIG. 12, in accordance with embodiments of the present disclosure.
Figure 15:
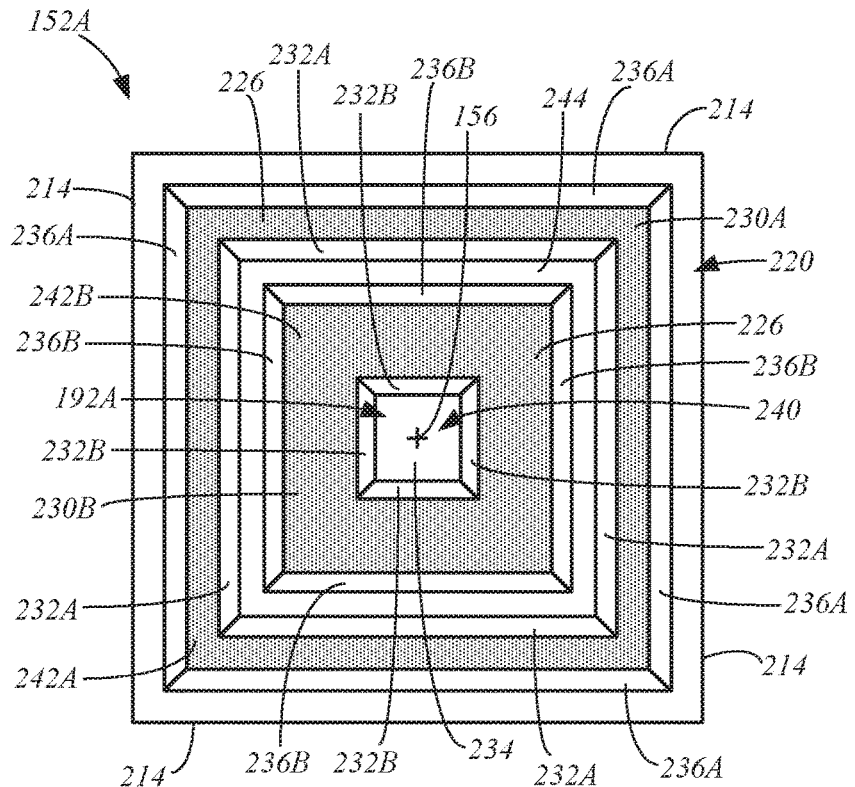

FIGS. 14 and 15 respectively are a cross-sectional view of a pressure sensor assembly 110 and a bottom plan view of a backing layer 152A of the assembly 110 of FIG. 14, in accordance with embodiments of the present disclosure. In this example, the backing layer 152A includes multiple walls 230, such as walls 230A and 230B. Each of the walls 230 surrounds the axis 156 and the fluid cavity 192A through the backing layer 152A, and the wall 230A surrounds the wall 230B. The walls 230A and 230B reduce the contact area with the adjoining backing layer 152B relative to the example shown in FIG. 7, and isolate the sensing layer 150 from stresses in the backing layer 152A. The wall 230A has a contact area 242A of the surface 226 that contacts or is attached to the surface 224 of the backing layer 152B through the bond 196, and the wall 230B has a contact area 242B of the top surface 226 that contacts or is attached to the surface 224 of the backing layer 152B through the bond 196. As discussed above, the bonds 196 may be electrically insulative bonds. An exterior surface 236A of the wall 230A may form an interior surface of a notch 220, and the interior surface 232A of the wall 230A may define a boundary of an interior cavity 244. The interior cavity 244 may be sealed from both the pathway 192 and the sensor exterior, which may reduce or minimize the stress induced on the diaphragm 176 from the sensor mounting by reducing the rigidity of the backing layer 152A. An exterior surface 236B of the wall 230B may define a boundary of the cavity 244, and an interior surface 232B of the wall 230B may define a boundary of the cavity 234 of the pathway 192A through the backing layer 152A.

Figure 16:
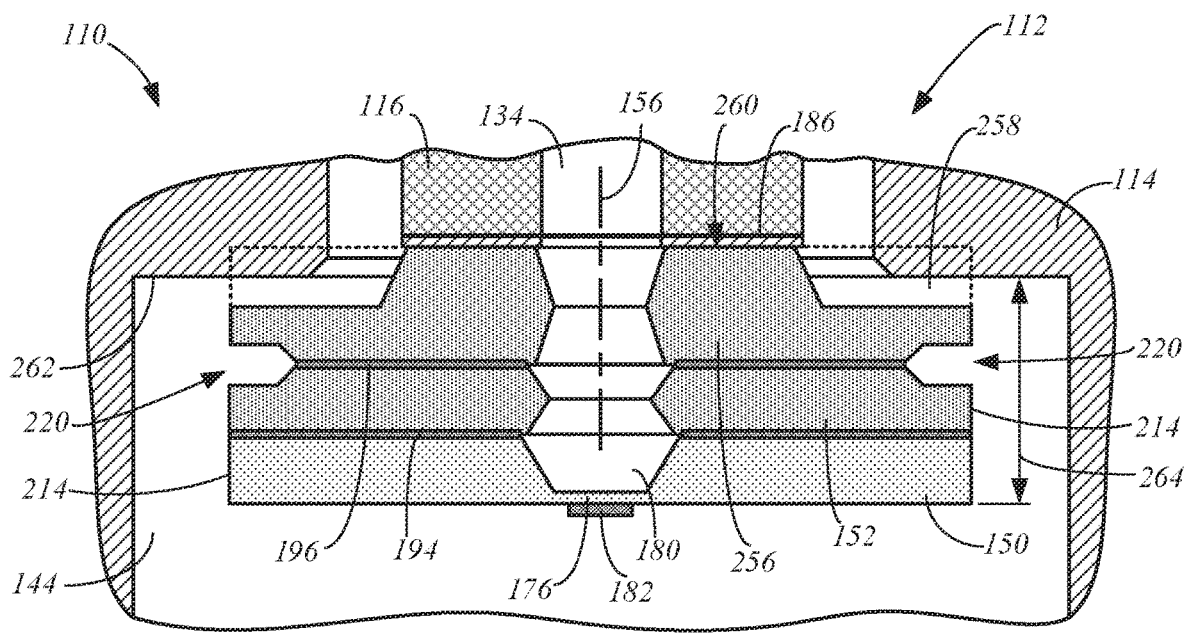
FIG. 16 is a simplified cross-sectional view of a sensor assembly, in accordance with embodiments of the present disclosure.

FIG. 16 is a simplified cross-sectional view of a pressure sensor assembly 110, in accordance with embodiments of the present disclosure. In the pressure sensor assembly 110 example provided in FIG. 16, the layer 256 of the pressure sensor 112 allows for a shorter pedestal 116 relative to the pressure sensor assembly 110 of FIG. 3, for example. Here, the layer 256 of the pressure sensor 112 may take the form of an electrically insulative layer, such as layer 154 of the pressure sensor 112 of FIG. 3, or an electrically conductive backing layer, such as the layer 152 of FIG. 5.

As shown in FIG. 16, the layer 256 is shaped relative to its wafer form (dashed lines) to maintain a gap 258 between the layer 256 and the header 114, while allowing the surface 260 of the layer 256 to be positioned along the axis 156 above a shoulder 262 of the header 114, rather than below the shoulder 262 of the header 114, as shown in FIG. 3. This allows the height 264 of the pressure sensor 112 measured along the axis 156 from the shoulder 262 of the header 114 to be reduced relative to other configurations, such as that shown in FIG. 3. Additionally, the pedestal 116 may be formed shorter, allowing the surface 138 of the pedestal to be positioned above the shoulder 262 of the header 114. As a result, the pressure sensor assembly 110 may be formed more compactly than other pressure sensor assembly designs, such as that shown in FIG. 3. Additionally, the shorter fluid pathway 122 from the base 142 of the header 114 (FIG. 3) to the cavity 180 allows for a reduction in the fill fluid volume that is used by the pressure sensor assembly 110.

As discussed above, in some embodiments a metal layer 186 (FIGS. 4D and 5), such as solder, is applied to the top of the pressure sensor 112 to facilitate attachment of the pressure sensor 112 to the pedestal 116. Some embodiments of the present disclosure include features that reduce the potential for contamination of the pathway through the pressure sensor 112 and the cavity 180 with the applied metal when the metal layer 186 is applied.

In one example, one or more restrictions 270 are created in the pathway of the pressure sensor 112, such as shown in FIGS. 4D and 5. In one embodiment, each restriction 270 is formed by a tapered section of the pathway, such as that provided in the layer 152 of the pressure sensor 112 shown in FIG. 4D, and in the layers 152A and 152B of the pressure sensor 112 shown in FIG. 5. Each restriction 270 provides a partial block to potential contamination of the pathway through the pressure sensor 112 and the cavity 180 during application of the metal layer 186 to the surface 198 of the backing layer 152A. Such restrictions 270 may also be formed in the electrically insulative layer 154 of the pressure sensor 112 of FIG. 4D.

Although the embodiments of the present disclosure have been described with reference to preferred embodiments, workers skilled in the art will recognize that changes may be made in form and detail without departing from the spirit and scope of the present disclosure. Embodiments of the present disclosure include combinations of one or more of the embodiments described herein. For example, the sensor element may comprise a capacitive electrode having a capacitance, which is measured between the capacitive electrode and a reference electrode, that indicates the process pressure P.

What is claimed is:

1. A pressure sensor assembly comprising:
a pressure sensor including:
an electrically conductive sensing layer including a sensor diaphragm extending between perimeter support regions, the sensor diaphragm having a reduced thickness relative to the perimeter support regions;
a backing layer assembly comprising one or more electrically conductive backing layers including a first backing layer having a bottom surface that is bonded to a top surface of the sensing layer through a first electrically insulative bond;
a sensor element having an electrical parameter that changes based on a deflection of the sensor diaphragm in response to a pressure difference between a first pressure on a first side of the sensor diaphragm and a second pressure on a second side of the sensor diaphragm that is opposite the first side; and
a notch formed in an exposed and uninsulated side of at least one of the sensing layer and the backing layer assembly, wherein the notch defines a gap between electrically conductive side edges of the pressure sensor that provides electrical insulation from voltage arcing between the electrically conductive side edges;
a pedestal including a bottom surface that is bonded to a top surface of the backing layer assembly; and
an electrically conductive header having a header cavity;
wherein the first electrically insulative layer electrically insulates the sensing layer from the pedestal and the header.

2. The pressure sensor assembly of claim 1, wherein the first electrically insulative bond comprises a coating of an electrically insulative material between the bottom surface of the first backing layer and the top surface of the sensing layer.

3. The pressure sensor assembly of claim 2, wherein:
the pressure sensor includes a first pathway extending through the electrically insulative layer and the conductive backing layer and to a sensor cavity in the sensing layer that is exposed to the first side of the sensor diaphragm;
the pedestal includes a second pathway that is connected to the first pathway; and
the electrically conductive header includes a third pathway that is connected to the second pathway and a vent to ambient air.

4. The pressure sensor assembly of claim 3, wherein the notch is formed in the first backing layer.

5. The pressure sensor assembly of claim 3, wherein the notch is formed in the sensing layer and the first backing layer and spans the first electrically insulative bond.

6. The pressure sensor assembly of claim 3, wherein the sensing layer and the one or more backing layers each comprise crystalline silicon.

7. The pressure sensor assembly of claim 1, wherein the one or more electrically conductive backing layers of the backing layer assembly includes a second backing layer having a bottom surface that is bonded to a top surface of the first backing layer through a second electrically insulative bond.

8. The pressure sensor assembly of claim 7, wherein each of the first and second electrically insulative bonds comprises a coating of an electrically insulative material between the top surface of the first backing layer and the bottom surface of the sensing layer.

9. The pressure sensor assembly of claim 8, wherein each of the first and second electrically insulative bonds is hermetic and is selected from the group consisting of a frit bond, thermocompression bond, a fusion bond, or an anodic bond.

10. The pressure sensor assembly of claim 7, wherein the notch is formed in the first backing layer.

11. The pressure sensor assembly of claim 7, wherein the notch is formed in the sensing layer and the first backing layer and spans the first electrically insulative bond.

12. The pressure sensor assembly of claim 7, wherein:
the pressure sensor comprises one or more pedestal structures formed in the first or second backing layer that provide stress isolation to the sensing layer;
when the one or more pedestal structures are formed in the first backing layer, each pedestal structure includes the top surface of the first backing layer; and
when the one or more pedestal structures are formed in the second backing layer, each pedestal structure includes the bottom surface of the second backing layer.

13. The pressure sensor assembly of claim 12, wherein the one or more pedestal structures include a wall formed in the first or second backing layer, the wall defining a boundary of an interior cavity of the first pathway.

14. The pressure sensor assembly of claim 12, wherein the one or more pedestal structures includes a first wall that surrounds an opening of the first fluid pathway.

15. The pressure sensor assembly of claim 14, wherein the one or more pedestal structures includes a second wall that surrounds the first wall.

16. The pressure sensor assembly of claim 1, wherein the sensor element comprises a strain gauge.

17. The pressure sensor assembly of claim 1, further comprising measuring circuitry coupled to the sensor element and configured to determine a pressure value based on the electrical parameter.

18. The pressure sensor assembly of claim 1, wherein the pedestal is electrically conductive.

* * * * *